(12) United States Patent
Kurimura et al.

(10) Patent No.: US 11,407,688 B2
(45) Date of Patent: Aug. 9, 2022

(54) COATING STRUCTURE, TURBINE PART HAVING SAME, AND METHOD FOR MANUFACTURING COATING STRUCTURE

(71) Applicant: Mitsubishi Hitachi Power Systems, Ltd., Kanagawa (JP)

(72) Inventors: Takayuki Kurimura, Tokyo (JP); Mineaki Matsumoto, Tokyo (JP); Shuji Tanigawa, Tokyo (JP); Yoshifumi Tsuji, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 792 days.

(21) Appl. No.: 16/098,368

(22) PCT Filed: Apr. 11, 2017

(86) PCT No.: PCT/JP2017/014844
§ 371 (c)(1),
(2) Date: Nov. 1, 2018

(87) PCT Pub. No.: WO2017/195518
PCT Pub. Date: Nov. 16, 2017

(65) Prior Publication Data
US 2019/0119172 A1 Apr. 25, 2019

(30) Foreign Application Priority Data
May 13, 2016 (JP) .............................. JP2016-097038

(51) Int. Cl.
*C04B 35/16* (2006.01)
*C04B 41/89* (2006.01)
(Continued)

(52) U.S. Cl.
CPC .............. *C04B 41/89* (2013.01); *C04B 35/16* (2013.01); *C04B 41/4596* (2013.01);
(Continued)

(58) Field of Classification Search
None
See application file for complete search history.

(56) References Cited

U.S. PATENT DOCUMENTS

| | | |
|---|---|---|
| 5,622,751 A | 4/1997 | Thebault et al. |
| 6,517,960 B1 | 2/2003 | Wang |
| (Continued) | | |

FOREIGN PATENT DOCUMENTS

| | | |
|---|---|---|
| CN | 101613209 | 12/2009 |
| CN | 105026339 | 11/2015 |
| (Continued) | | |

OTHER PUBLICATIONS

Office Action dated Apr. 20, 2020 in corresponding Korean Patent Application No. 10-2018-7032607 with English-language translation.
(Continued)

*Primary Examiner* — Seth Dumbris
(74) *Attorney, Agent, or Firm* — Wenderoth, Lind & Ponack, L.L.P.

(57) ABSTRACT

Provided are a coating structure, a turbine part having the same, and a method for manufacturing the coating structure. The coating structure is provided on a surface of a base portion including a ceramic matrix composite. The coating structure is layered on the surface of the base portion, and includes a bond coat layer formed of a rare-earth silicate and a top coat layer layered on the bond coat layer. The residual stress present in the bond coat layer is compressive residual stress. The oxygen permeability coefficient of the bond coat layer is no greater than $10^{-9}$ $kg \cdot m^{-1} \cdot s^{-1}$ at a temperature of not lower than 1200° C. and a higher oxygen partial pressure of not less than 0.02 MPa. The bond coat layer may contain carbonitride particles or carbonitride whiskers.

10 Claims, 5 Drawing Sheets

(51) Int. Cl.
- *F01D 25/00* (2006.01)
- *F01D 25/24* (2006.01)
- *F23R 3/42* (2006.01)
- *F02C 7/00* (2006.01)
- *F01D 5/18* (2006.01)
- *C04B 41/45* (2006.01)
- *C04B 41/50* (2006.01)
- *F01D 5/14* (2006.01)

(52) U.S. Cl.
CPC ............ *C04B 41/5024* (2013.01); *F01D 5/14* (2013.01); *F01D 5/18* (2013.01); *F01D 25/00* (2013.01); *F01D 25/24* (2013.01); *F02C 7/00* (2013.01); *F23R 3/42* (2013.01)

(56) References Cited

U.S. PATENT DOCUMENTS

| | | | |
|---|---|---|---|
| 7,056,574 B2 * | 6/2006 | Ojard | C04B 41/009 428/293.4 |
| 7,138,183 B2 | 11/2006 | Hisamatsu et al. | |
| 8,940,417 B2 | 1/2015 | Courcot et al. | |
| 2002/0098391 A1 * | 7/2002 | Tanaka | C04B 41/5024 428/697 |
| 2004/0234783 A1 * | 11/2004 | Eaton | C04B 41/87 428/446 |
| 2006/0014029 A1 * | 1/2006 | Saak | C23C 28/042 428/446 |
| 2007/0014996 A1 * | 1/2007 | Bhatia | C23C 28/341 427/446 |
| 2016/0160664 A1 | 6/2016 | Luthra et al. | |

FOREIGN PATENT DOCUMENTS

| | | |
|---|---|---|
| EP | 2344590 | 7/2011 |
| JP | 5-270950 | 10/1993 |
| JP | 10-87386 | 4/1998 |
| JP | 2005-200226 | 7/2005 |
| JP | 2007091504 * | 9/2005 |
| JP | 2005-335990 | 12/2005 |
| JP | 2007-91504 | 4/2007 |
| JP | 2008-247722 | 10/2008 |
| JP | 2012-513946 | 6/2012 |
| JP | 2013-139633 | 7/2013 |
| JP | 2015-113255 | 6/2015 |
| KR | 10-2002-0003870 | 1/2002 |
| KR | 10-2014-0138190 | 12/2014 |
| TW | 530035 | 4/1989 |
| WO | 2013/126466 | 8/2013 |

OTHER PUBLICATIONS

Xu et al., "Preparation and Oxidation Resistance of $LaMgAl_{11}O_{19}/Er_2Si_2O_7$ Coating Deposited on Cf/SiC Composites", Journal of Wuhan University of Technology, 2015, vol. 37, No. 12, with English Abstract.

International Search Report dated Jul. 11, 2017 in International (PCT) Application No. PCT/JP2017/014844.

Notification of Reasons for Refusal dated Jul. 27, 2016 in Japanese Application No. 2016-097038 with English translation.

Yuzuru Ogura et al., "Oxygen Permeability of $Y_2SiO_5$", Materials Transactions, vol. 42, No. 6, pp. 1124-1130, 2001.

Office Action dated Jun. 2, 2021 in corresponding German Patent Application No. 112017002453.6.

* cited by examiner

COATING STRUCTURE, TURBINE PART HAVING SAME, AND METHOD FOR MANUFACTURING COATING STRUCTURE

TECHNICAL FIELD

The present invention relates to a coating structure, a turbine part having the same, and a method for manufacturing the coating structure.

BACKGROUND ART

Aviation and industrial gas turbines and flying objects include a portion of which the temperature becomes not lower than 1000° C. For the portion (high-temperature portion) of which the temperature becomes not lower than 1000° C., use of a portion produced from a Ceramic Matrix Composite (CMC) has been investigated. As a structure for improving steam corrosion resistance and heat shielding property, a structure in which an Environmental Barrier Coating (EBC) or a Thermal Barrier Coating (TBC) is formed on a surface of the ceramic matrix composite has been investigated.

As a coating structure provided on a surface of a base material containing a ceramic matrix composite, Patent Document 1 describes a coating structure including a first protective film including at least one of an environmental barrier coating film and a thermal barrier coating film provided on the surface of the base material and a second protective film including an aluminum oxide film provided on the first protective film. Further, Patent Document 1 describes that when the TBC film is used for the first protective film of the coating structure, the coating structure is a structure in which a bond coat film and a ceramic film are layered.

CITATION LIST

Patent Document

Patent Document 1: JP 2015-113255 A

SUMMARY OF INVENTION

Problem to be Solved by the Invention

In Patent Document 1, the bond coat film is formed of a MCrAlY alloy (wherein M is Co, Ni, or a combination thereof). However, when an alloy is used for the bond coat film as described above, there is a problem in which the heat resistance cannot be enhanced.

An object of the present invention is to provide a coating structure having high heat resistance, a turbine part having the same, and a method for manufacturing the coating structure.

Solution to Problem

The present invention is a coating structure provided on a surface of a base portion including a ceramic matrix composite. The coating structure includes a bond coat layer formed of a rare-earth silicate, the bond coat layer layered on the surface of the base portion, and a top coat layer layered on the bond coat layer. In the bond coat layer, the residual stress is compressive residual stress.

According to the present invention, the bond coat layer can be made compact, and is unlikely to be cracked. Therefore, the airtightness and oxidation resistance can be increased. Therefore, the base portion can be protected even in a higher-temperature environment.

The oxygen permeability coefficient of the bond coat layer is preferably not greater than $10^{-9}$ $Kg \cdot m^{-1} \cdot s^{-1}$ at not lower than 1200° C. and a higher oxygen partial pressure of not less than 0.02 MPa. In this case, the airtightness of the bond coat layer can be increased and the tolerable temperature can be increased. Therefore, the base portion can be protected even in a higher-temperature environment.

Herein, the crystal ratio of the bond coat layer is preferably from 90% to 100%. In this case, occurrence of cracking and separation due to a change in volume with crystallization in a usage environment of the bond coat layer can be suppressed, and the airtightness can be increased.

It is preferable that the bond coat layer be layered without another material interposed between the bond coat layer and the surface of the base portion. Thus, a layered structure can be made simple.

It is preferable that the residual stress of the bond coat layer be smaller than that of the top coat layer. When the residual stress of the bond coat layer is decreased, occurrence of cracking and the like in the bond coat layer can be suppressed, and the airtightness can be increased.

The grain size in the bond coat layer is preferably from 0.01 μm to 10 μm. In this case, the structure of the bond coat layer can be complicated, generation of a crack connecting a front surface to a back surface of the bond coat layer can be suppressed, and the airtightness can be increased.

In the bond coat layer, it is preferable that a dispersed material containing silicon or titanium be dispersed in the rare-earth silicate. In this case, the toughness and the creep resistance of the bond coat layer can be increased. Due to silicon oxide or titanium oxide produced by oxidation of dispersed particles, a self-healing function of closing a crack is expressed.

Further, it is preferable that the dispersed material be particles. In this case, the bond coat layer can be simply manufactured.

It is preferable that the dispersed material be whiskers. In this case, the toughness can be efficiently increased.

It is preferable that the dispersed material contain nitrogen. The oxidation resistance of a nitride is higher than that of a carbide. Therefore, the effect of the dispersed material can be held for an extended period of time.

The present invention is a turbine part. The turbine part includes any coating structure described above, and the base portion having the coating structure on a surface thereof. Therefore, the turbine part can be used in a higher-temperature environment.

The present invention is a method for manufacturing a coating structure including steps of forming a film on a surface of a base portion containing a ceramic matrix composite from a rare-earth silicate through an aerosol deposition process, to form a bond coat layer; forming a top coat layer on a surface of the bond coat layer through thermal spraying; and performing a heat treatment for a layered body including the bond coat layer and the top coat layer after forming the bond coat layer and the top coat layer. Through the method, a coating structure capable of increasing the heat resistance and protecting a base material even in a higher-temperature environment can be manufactured.

Advantageous Effect of Invention

According to the present invention, the heat resistance can be increased and a base material can be protected even in a higher-temperature environment.

DESCRIPTION OF EMBODIMENTS

Embodiments according to the present invention will be described below with reference to the accompanying drawings. However, the present invention is not limited to these embodiments. The embodiments that will be described below can be combined with each other as necessary. Furthermore, some constituent elements may not be used in some cases. In addition, the constituent elements in the embodiments described below include those that can be easily replaced by a person skilled in the art or those that are substantially the same. In an embodiment, a turbine part of a gas turbine will be described as an example. However, a coating structure of the embodiment and a hot part having the coating structure can also be used for parts for other applications. For example, the coating structure of the embodiment and the hot part having the coating structure can be used for a part of a flying object.

Figure 1:
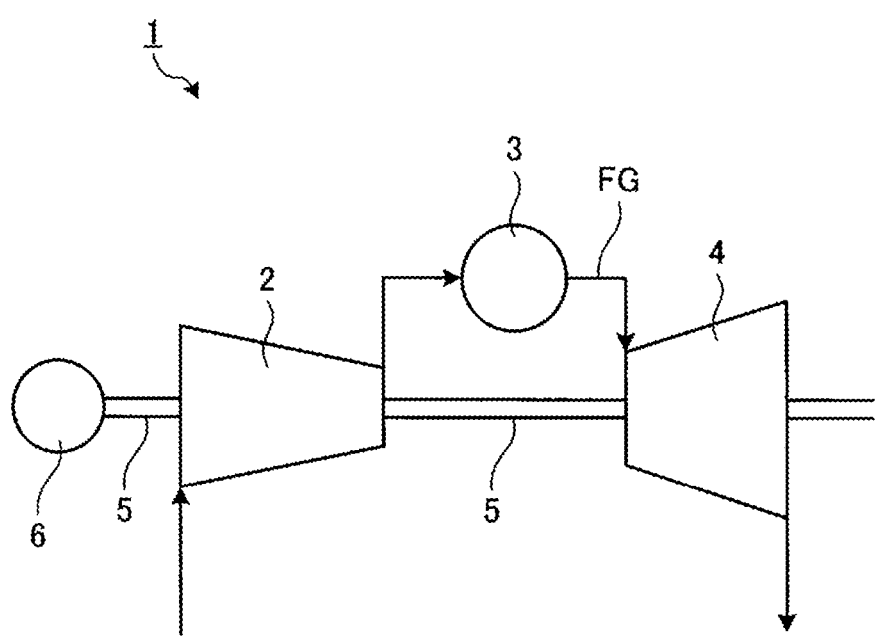
FIG. 1 is a schematic view illustrating an example of a gas turbine according to an embodiment of the present invention.

FIG. 1 is a schematic view illustrating an example of a gas turbine 1 according to an embodiment. The gas turbine 1 includes a compressor 2 of compressing combustion air, a combustor 3 of spraying a fuel to a compressed air supplied from the compressor 2, and burning the fuel to produce a combustion gas FG, and a turbine portion 4 configured to be driven by the combustion gas FG supplied from the combustor 3, a power generator 6, and a rotating shaft 5 disposed in the compressor 2, the turbine portion 4, and the power generator 6.

Figure 2:
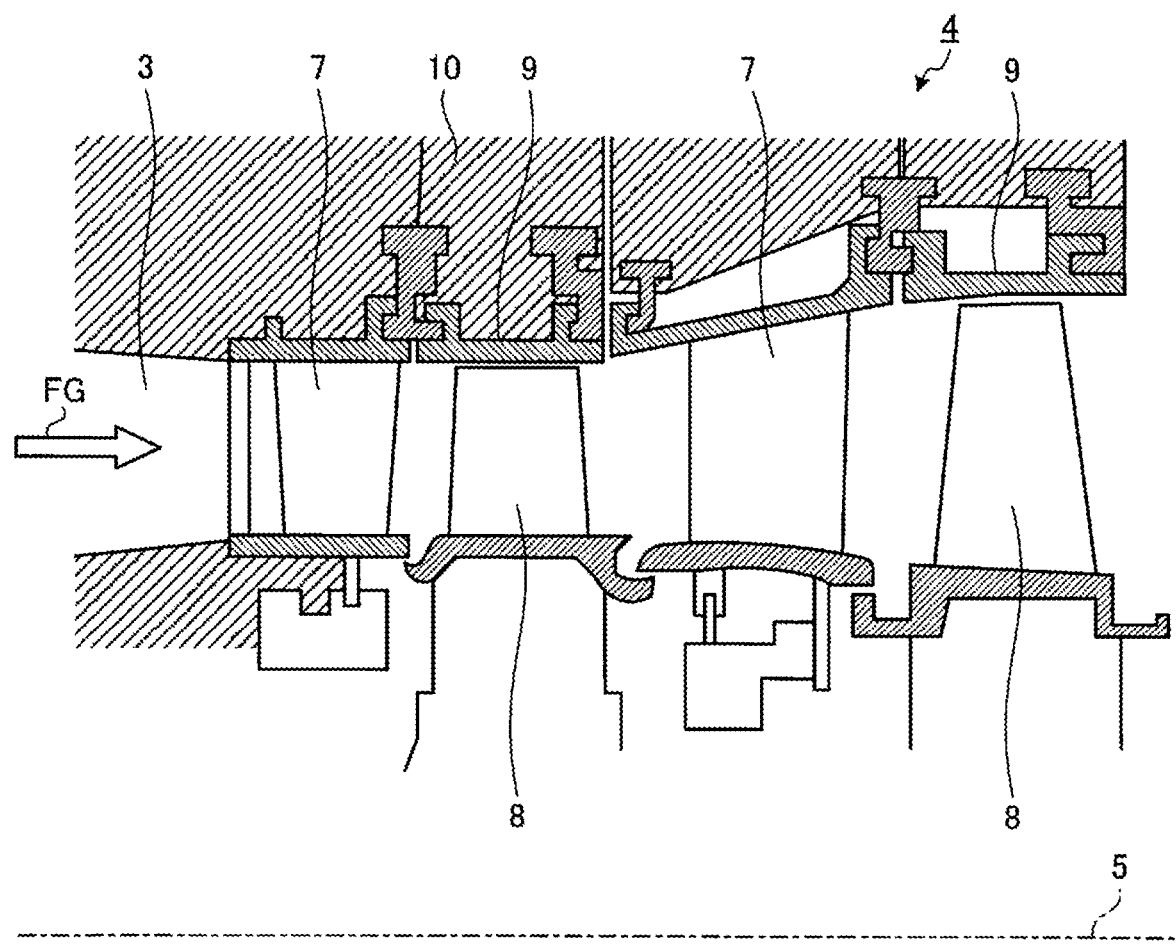
FIG. 2 is a cross-sectional view illustrating an example of a turbine portion according to the embodiment.

FIG. 2 is a cross-sectional view illustrating a part of the turbine portion 4. The turbine portion 4 includes a turbine vane 7 disposed around the rotating shaft 5, a turbine blade 8 disposed around the rotating shaft 5, and a ring segment 9 disposed outside the turbine blade 8 in a radial direction with respect to the rotating shaft 5.

The ring segment 9 is supported by a casing 10. The ring segment 9 is an annular member, and includes a plurality of segments arranged in a circumferential direction of the rotating shaft 5. A gap is provided between the ring segment 9 and a tip end of the turbine blade 8.

In the following description, a member for the gas turbine 1 is appropriately referred to a turbine member 20. The turbine member 20 is a hot part (hot member) used in a high-temperature environment. The turbine member 20 may be a member for the turbine portion 4 or a member for the combustor 3. The turbine member 20 may be the turbine vane 7, the turbine blade 8, or the ring segment 9.

Figure 3:
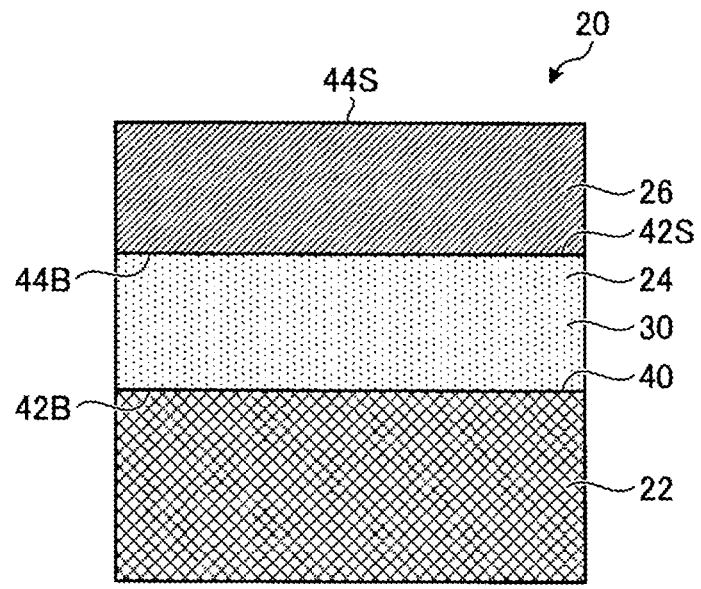
FIG. 3 is a cross-sectional view schematically illustrating an example of a turbine member having a coating structure according to the embodiment.

FIG. 3 is a cross-sectional view schematically illustrating an example of the turbine member 20. As illustrated in FIG. 3, the turbine member (hot part) 20 includes a base portion (substrate) 22 and a coating structure formed on a surface of the base portion 22.

The base portion 22 is formed of a ceramic matrix composite (CMC). The ceramic matrix composite (hereinafter referred to as CMC) is a material in which inorganic particles, metal particles, whiskers, short fibers, and long fibers are composited with ceramics to enhance the strength. As CMC, silicon carbide (SiC) may be used. CMC has a smaller specific gravity and higher heat resistance than those of a nickel-based superalloy.

The coating structure includes a bond coat layer 24 provided on a surface 40 of the base portion 22 and a top coat layer 26 provided on the bond coat layer 24. The bond coat layer 24 includes a back surface 42B in contact with the base portion 22 and a surface 42S facing a side opposite to the back surface 42B. The top coat layer 26 includes a back surface 44B in contact with the bond coat layer 24 and a surface 44S facing a side opposite to the back surface 44B.

The bond coat layer 24 is layered on the surface 40 of the base portion 22. The bond coat layer 24 can be formed through an aerosol deposition process as described below. The bond coat layer 24 is formed of a base material 30. The base material 30 is formed of a rare-earth silicate. The rare-earth silicate is a silicon compound containing a rare-earth element such as yttrium (Y), scandium (Sc), cerium (Ce), neodymium (Nd), and ytterbium (Yb). Examples of the rare-earth silicate containing a rare-earth element (Ln: Y, Sc, Ge, Nd, Yb, Lu, etc.) include $Ln_2Si_2O_7$, $Ln_2SiO_5$, and a mixed phase of $Ln_2Si_2O_7$ and $Ln_2SiO_5$. A plurality of rare-earth elements may be used as Ln in combination, like $(Y, Yb)_2Si_2O_7$.

The residual stress of the bond coat layer 24 is compressive residual stress. The oxygen permeability coefficient of the bond coat layer 24 is preferably not greater than $10^{-9}$ $kg \cdot m^{-1} \cdot s^{-1}$ at not lower than 1200° C. and an oxygen partial pressure on a surface side (a higher oxygen partial pressure) of not less than 0.02 MPa, for example, at not lower than 1200° C. and an oxygen partial pressure on a surface side (a higher oxygen partial pressure) of 0.02 MPa. The oxygen permeability coefficient can be measured by a gas transmittance measurement device as described in a document (Y. Ogura et al., "Oxygen permeability of $Y_2SiO_5$", Materials Transactions, 42 (6), pp. 1124 to 1130 (2001)).

The top coat layer 26 is layered on the bond coat layer 24. The top coat layer 26 can be formed on the bond coat layer 24 through thermal spraying. For the top coat layer 26, a rare-earth silicate may be used as a base material. For the top coat layer 26, a $ZrO_2$-based material may be used. In particular, the top coat layer 26 may contain yttria stabilized zirconia that is $ZrO_2$ partially or completely stabilized with $Y_2O_3$.

In the coating structure, the bond coat layer 24 and the top coat layer 26 are layered as described above. The coating structure is a layered structure including the bond coat layer 24 and the top coat layer 26. Therefore, the coating structure has a function of at least one of an Environmental Barrier Coating (EBC) film and a Thermal Barrier Coating (TBC)

film. Accordingly, the coating structure has high heat resistance, high airtightness, and high oxidation resistance, and can protect the base portion 22.

In the coating structure, the bond coat layer 24 contains a rare-earth silicate as a base material, and the residual stress of the bond coat layer 24 is compressive residual stress. Therefore, the bond coat layer 24 is unlikely to be cracked, has high airtightness and high oxidation resistance, and can protect the base portion 22. When the substrate 22 is coated with the coating structure through a thermal spraying process, a film is shrunk in a cooling stage, and the film has tensile residual stress. On the other hand, since an aerosol deposition process is performed at room temperature, the temperature is not changed after formation of a film, the residual stress is not tensile residual stress, and is zero stress (in a state of stress close to 0), which does not reach compressive stress. When the residual stress is compressive residual stress as described above, the coating structure is unlikely to be broken. The bond coat layer 24 formed through the aerosol deposition process has zero stress. When the top coat layer 26 is formed, for example, through a thermal spraying process, the top coat layer 26 is shrunk in a cooling stage. As a result, tensile residual stress is generated in a top coat, but compressive stress corresponding to the tensile residual stress is generated in the bond coat layer. Therefore, in the coating structure, the residual stress is compressive residual stress.

When in the coating structure, the bond coat layer 24 contains a rare-earth silicate as the base material and the oxygen permeability coefficient is not greater than $10^{-9}$ kg·m$^{-1}$·s$^{-1}$ at not lower than 1200° C., the airtightness of the bond coat layer 24 can be increased and the tolerable temperature can be increased.

When the coating structure is a structure in which the bond coat layer 24 is layered without another material interposed between the bond coat layer 24 and the surface of the base portion 22, the layered structure can be simple. Since for the bond coat layer 24, a rare-earth silicate is used, the linear expansion coefficient of the bond coat layer 24 can be made close to that of the base portion 22. Therefore, partial concentration of a load due to a change in temperature during use can be suppressed.

In the coating structure, a rare-earth silicate is used for both the bond coat layer 24 and the top coat layer 26. Therefore, properties of the base portion 22, the bond coat layer 24, and the top coat layer 26, such as linear expansion coefficient at a plurality of different temperatures, can be made similar to each other. Further, partial concentration of a load due to a change in temperature during use can be suppressed.

In the coating structure, the crystal ratio of the bond coat layer 24 is preferably from 90% to 10%. When the crystal ratio of the bond coat layer 24 in the coating structure falls within the aforementioned range, occurrence of cracking in the bond coat layer 24 can be suppressed, and the airtightness can be increased. In the coating structure, the crystal ratio of the bond coat layer 24 is preferably from 90% to 10% after formation of the bond coat layer 24 and the top coat layer 26 before a heat treatment during manufacturing. When the bond coat layer 24 in the coating structure is formed through the aerosol deposition process, the crystal ratio before the heat treatment can be increased. Thus, the heat treatment can be made simple, and the crystal ratio of the bond coat layer 24 in the coating structure can be increased.

In the coating structure, the grain size in the bond coat layer 24 is preferably from 0.01 μm to 10 μm. When the grain size in the bond coat layer 24 falls within the aforementioned range, the structure of the bond coat layer 24 can be complicated, generation of a crack connecting a front surface to a back surface of the bond coat layer 24 can be suppressed, and the airtightness can be increased.

In the coating structure, it is preferable that the residual stress of the bond coat layer 24 be smaller than that of the top coat layer 26. When the residual stress of the bond coat layer 24 in the coating structure is decreased, occurrence of cracking and the like in the bond coat layer 24 can be suppressed, and the airtightness can be increased.

In the embodiment, a difference in thermal expansion coefficient between the coating structure and base portion is small, and the coating structure has high adhesion. Therefore, a rare-earth silicate is used for the base materials (matrixes) of the top coat layer and the bond coat layer. However, zircon ($ZrSiO_4$) or $HfSiO_4$ in which a difference in thermal expansion coefficient between the coating structure and the base portion is small and the adhesion is high may be used.

Figure 4:
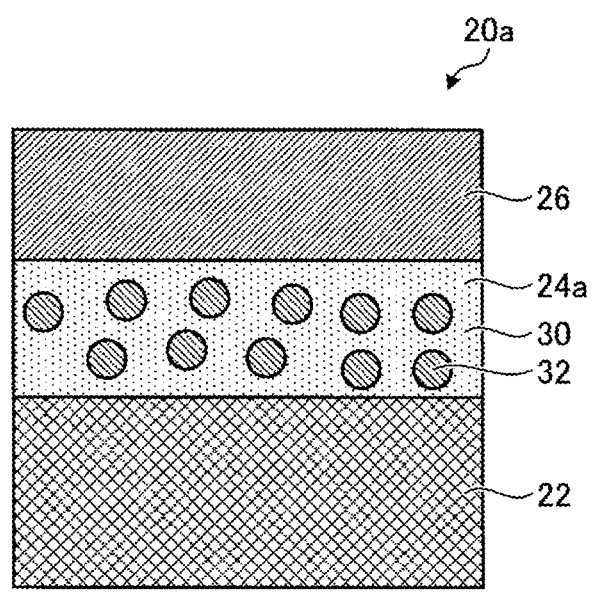
FIG. 4 is a cross-sectional view schematically illustrating an example of a turbine member having a coating structure according to another embodiment.

FIG. 4 is a cross-sectional view schematically illustrating an example of a turbine member having a coating structure according to another embodiment. In a turbine member 20a, detailed description about the same structure as that of the turbine member 20 is omitted. Points specific to the turbine member 20a will be particularly described below. The turbine member 20a illustrated in FIG. 4 includes the base portion 22 and a coating structure. The coating structure includes a bond coat layer 24a and the top coat layer 26.

The bond coat layer 24a includes the base material 30 and particles 32. The base material 30 is a rare-earth silicate, which is the same as the base material for the bond coat layer 24. The particles 32 are dispersed in the base material 30. The particles 32 have a structure in which the diameter is smaller than the thickness of the bond coat layer 24a. The particle diameter of the particles 32 is preferably from 0.01 μm to 10 μm, for example, 1 μm. The particles 32 are formed of a silicon compound (Si compound) or a titanium compound. The silicon compound includes various compounds containing nitrogen and oxygen. The titanium compound includes a carbide of titanium (titanium carbide), a nitride of titanium (titanium nitride), and a carbonitride of titanium (titanium carbonitride).

When the particles 32 are dispersed in the bond coat layer 24a, the creep resistance and fracture toughness of the coating structure can be improved. For example, when in the coating structure, the particles 32 are dispersed, a foreign material can be dispersed in the base material 30, and creep deformation can be suppressed. Even when the base material 30 is cracked, a crack in the coating structure can be stopped at a position in contact with the particles 32. When the compound in a surface of the particles becomes an oxide, a self-healing function for closing a crack is expressed. Thus, generation of a crack that reaches from the surface of the bond coat layer 24 to the back surface can be suppressed.

It is preferable that the particles 32 contain nitrogen. Examples of a silicon compound containing nitrogen include SiCNO, $Si_3N_4$, sialon ($Si_3N_4$—$Al_2O_3$), and $Si_2N_2O$. Since the particles 32 contain nitrogen, oxygen can be collected by the particles 32 during penetration of oxygen into the bond coat layer 24a. In the bond coat layer 24a, the oxidation resistance is improved due to the presence of nitrogen in the particles 32. Crack derivation, oxygen collection, and a crack-healing effect can be held for an extended period of time. Further, penetration of oxygen into the bond coat layer 24a and attainment of oxygen to the base portion 22 can be suppressed at high probability.

Figure 5:
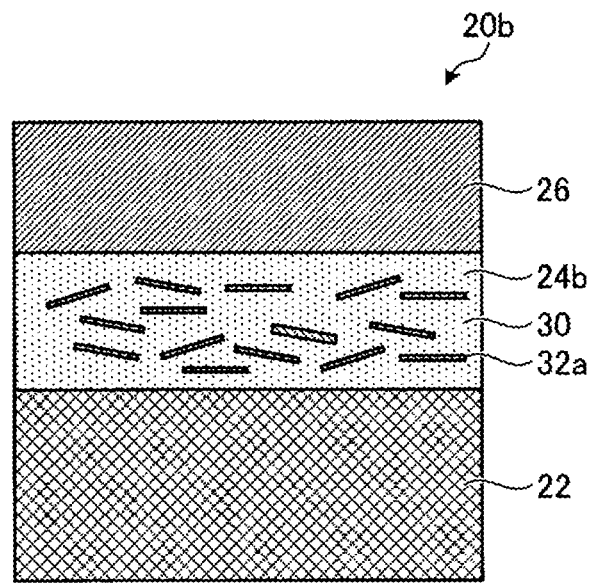
FIG. 5 is a cross-sectional view schematically illustrating an example of a turbine member having a coating structure according to still another embodiment.

FIG. 5 is a cross-sectional view schematically illustrating an example of a turbine member having a coating structure according to another embodiment. In a turbine member 20b, detailed description about the same structure as that of the turbine member 20 is omitted. Points specific to the turbine member 20b will be particularly described below. The turbine member 20b illustrated in FIG. 5 includes the base portion 22 and a coating structure. The coating structure includes a bond coat layer 24b and the top coat layer 26.

The bond coat layer 24b includes the base material 30 and whiskers 32a. The base material 30 is a rare-earth silicate, which is the same as the base material for the bond coat layer 24b. The whiskers 32a have a single-crystal fibrous (rod-shaped) structure. The whiskers 32a can be formed of the same material as that for the particles. For example, the whiskers 32a have a length of from 5 μm to 20 μm and a width of a cross section of about 100 nm.

When the whiskers 32a are dispersed in the bond coat layer 24b, the toughness of the coating structure can be improved as compared with a case where the particles 32 are dispersed, That is, when fibrous whiskers 32a are arranged, an area where the whiskers 32a are arranged as viewed in a direction orthogonal to the surface of the base portion 22 relative to the amount of the whiskers 32a mixed in the base material 30 can be increased. Thus, generation of a crack that reaches from the surface of the bond coat layer 24b to the back surface can be suppressed.

In the bond coat layer 24b, it is preferable that the amount of whiskers 32a of which the axial direction of fibrous shape is a direction along the surface of the substrate 22 be larger than that of whiskers 32a of which the axial direction of fibrous shape is a direction orthogonal to the surface of the substrate 22.

The structure of granular substance dispersed in the base material 30 of the bond coat layer 24a or 24b is not limited to the particles 32 and the whiskers 32a. For example, a fibrous structure different from the whiskers 32a may be used as the granular substance. When the fibrous structure is used, progression of cracking can be efficiently stopped, and the toughness can be increased.

Figure 6:
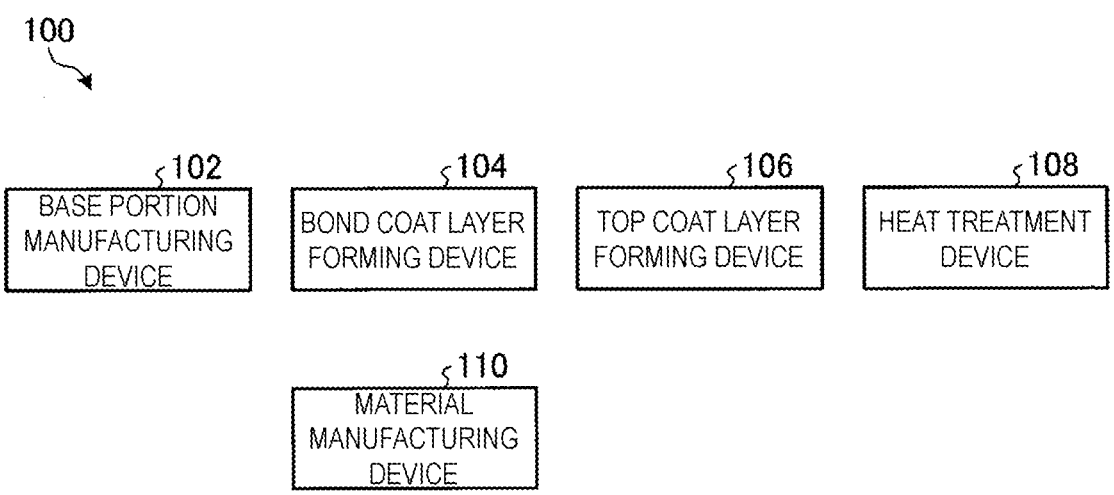
FIG. 6 is a block diagram of a part manufacturing system for manufacturing a turbine member of an embodiment.

FIG. 6 is a block diagram of a part manufacturing system for manufacturing a turbine member of the embodiment. By a part manufacturing system 100 illustrated in FIG. 6, a turbine part is manufactured. The part manufacturing system 100 includes a base portion manufacturing device 102, a bond coat layer forming device 104, a top coat layer forming device 106, a heat treatment device 108, and a material manufacturing device 110. The part manufacturing system 100 is a coating structure manufacturing system in which the bond coat layer forming device 104, the top coat layer forming device 106, the heat treatment device 108, and the material manufacturing device 110 are combined.

By the base portion manufacturing device 102, a base portion of the turbine portion is manufactured. A process for forming a base portion by the base portion manufacturing device 102 is not particularly limited. By the base portion manufacturing device 102, for example, a mold corresponding to the structure of the base portion is filled with a material, and the material is baked, to manufacture a base portion.

By the bond coat layer forming device 104, a bond coat layer is formed on a surface of the base portion. By the bond coat layer forming device 104, a material containing a rare-earth silicate that is a material for the bond coat layer as a base material is applied to the surface of the base portion through an aerosol deposition process (AD process). Specifically, fine particles and ultrafine particles that are the material for the bond coat layer are mixed with a gas, to form an aerosol, and the aerosol is sprayed onto the surface of the base portion in vacuum, to form the bond coat layer. Thus, a layer of the rare-earth silicate as the base material is formed as the bond coat layer on the surface of the base portion by the bond coat layer forming device 104.

A top coat layer is formed on a surface of the bond coat layer by the top coat layer forming device 106. By the top coat layer forming device 106, a rare-earth silicate that is a material for the top coat layer is applied to the surface of the bond coat layer through thermal spraying. Thus, a layer of the rare-earth silicate is formed as the top coat layer on the surface of the bond coat layer by the top coat layer forming device 106.

By the heat treatment device 108, a structure including the bond coat layer on the surface of the base portion and the top coat layer is subjected to a heat treatment. The heat treatment device 108 is a heating furnace. In the heat treatment device 108, the structure is held at a predetermined temperature, for example, from 700° C. to 1000° C., for a predetermined time (from several hours to several tens hours). Thus, a treatment for changing the properties of the structure is performed.

By the material manufacturing device 110, the materials for the bond coat layer and the top coat layer are manufactured. In the material manufacturing device 110, rare-earth silicates are processed into a state capable of being applied by the bond coat layer forming device 104 and the top coat layer forming device 106, respectively. When a material obtained by mixing fine substances such as particles and whiskers in the base material of the rare-earth silicate is used for the bond coat layer, the material obtained by mixing the fine substances in the base material of the rare-earth silicate is manufactured by the material manufacturing device 110.

Figure 7:
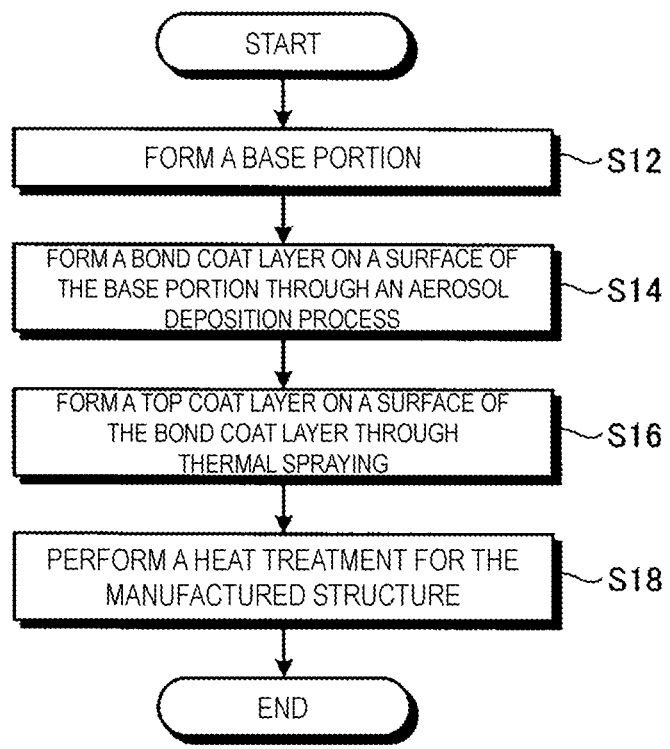
FIG. 7 is a flowchart illustrating an example of a method for manufacturing a turbine part according to an embodiment.

FIG. 7 is a flowchart illustrating an example of a method for manufacturing a turbine part according to the embodiment. A part of steps in the method for manufacturing a turbine part is a method for manufacturing a coating structure. The method illustrated in FIG. 7 can be realized by performing each step by the part manufacturing system 100.

In the part manufacturing system 100, a base portion is manufactured by the base portion manufacturing device 102 (Step S12). In the part manufacturing system 100, after manufacturing the base portion, a bond coat layer is formed on a surface of the base portion through an aerosol deposition process by the bond coat layer forming device 104 (Step S14). In the part manufacturing system 100, after forming the bond coat layer, a top coat layer is formed on a surface of the bond coat layer through thermal spraying by the top coat layer forming device 106 (Step S16). In the part manufacturing system 100, after forming the top coat layer, the formed structure is subjected to a heat treatment (Step S18).

In the part manufacturing system 100, the aforementioned steps are performed. Thus, a structure including the materials compactly arranged and having a few or no crack through which a gas is passed can be formed. The structure may be a structure having low oxygen transmittance. When the material for the bond coat layer is a rare-earth silicate or zircon, the bond coat layer can be formed on the surface of the base portion, and the heat resistance can be increased as compared with a case of using an alloy to be brought into a close contact with the top coat layer.

Therefore, through the method for manufacturing a coating structure, a coating structure including a bond coat layer having high heat resistance and high airtightness and a top coat layer having high heat resistance and capable of suppressing transmission of moisture water vapor can be manufactured.

In the embodiment, since the application is simple, the top coat layer is formed through thermal spraying by the top coat layer forming device 106. However, the top coat layer may be formed through a process other than thermal spraying.

REFERENCE SIGNS LIST

1 Gas turbine
2 Compressor
3 Combustor
4 Turbine portion
5 Rotating shaft
6 Power generator
7 Turbine vane
8 Turbine blade
9 Ring segment
10 Casing
20 Turbine member
22 Substrate (base portion)
24 Bond coat layer
26 Top coat layer
100 Part manufacturing system
102 Base portion manufacturing device
104 Bond coat layer forming device
106 Top coat layer forming device
108 Heat treatment device
110 Material manufacturing device

The invention claimed is:

1. A coating structure provided on a surface of a base portion including a ceramic matrix composite comprising:
a bond coat layer formed of a rare-earth silicate, the bond coat layer layered on the surface of the base portion; and
a top coat layer layered on the bond coat layer,
wherein the bond coat layer has a compressive residue stress as a residual stress, and an oxygen permeability coefficient of not greater than $10^{-9}$ $Kg \cdot m^{-1} \cdot s^{-1}$ at not lower than 1200° C. and a higher oxygen partial pressure of not less than 0.02 MPa, and
wherein the top coat layer has tensile residual stress.

2. The coating structure according to claim 1, wherein the bond coat layer has a crystal ratio of from 90% to 100%.

3. The coating structure according to claim 1, wherein the bond coat layer is layered without another material interposed between the bond coat layer and the surface of the base portion.

4. The coating structure according to claim 1, wherein the residue stress of the bond coat layer is smaller than that of the top coat layer.

5. The coating structure according to claim 1, wherein the bond coat layer has a grain size of from 0.01 μm to 10 μm.

6. The coating structure according to claim 1, wherein in the rare-earth silicate of the bond coat layer, a dispersed material containing silicon or titanium is dispersed.

7. The coating structure according to claim 6, wherein the dispersed material is particles.

8. The coating structure according to claim 6, wherein the dispersed material is whiskers.

9. The coating structure according to claim 6, wherein the dispersed material contains nitrogen.

10. A turbine part comprising the coating structure according to claim 1 and the base portion including the coating structure on the surface.

* * * * *